3,692,533
MODIFICATION OF THE PHYSICAL PROPERTIES OF FREEZE-DRIED RICE

Thomas O. Paine, Administrator of the National Aeronautics and Space Administration, with respect to an invention of Clayton S. Huber, Houston, Tex.
No Drawing. Filed Aug. 28, 1970, Ser. No. 68,023
Int. Cl. A23l 1/10
U.S. Cl. 99—80 PS                                   8 Claims

ABSTRACT OF THE DISCLOSURE

A process for preparing dehydrated rice wherein the rice is cooked in water to a gelatinized state. The grain includes about seventy-five percent moisture content. Thereafter, the granular rice is subjected to freezing and then thawing for two or more cycles. Then, it is frozen and freeze dried to remove moisture. The dehydrated granular rice is quickly rehydrated by placing it in hot water.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

SUMMARY OF PROBLEM AND SOLUTION

Rice is extremely significant as a staple food throughout the world. It is normally time consuming to prepare and serve as a fluffy granular product which is sufficiently tender to be eaten. Numerous processes have been advanced in the past to prepare "instant" rice. However, even instant rice requires perhaps five minutes of simmering or cooking time. Parboiled rice will sometimes require as much as one-half hour of cooking time to serve a product which is both tender and edible. Even greater periods of time are required to prepare brown rice and regular white milled rice. Quite clearly, the difficulties in preparing rice center principally on the time required for its preparation. Reducing the preparation time of rice would, in essence, create a new convenience food.

The method of the present invention is directed to a manner of preparing rice which provides a product which is quickly prepared, relatively light weight, easily stored, and conveniently handled. The final product is a dehydrated rice granule which is substantially reduced in weight and which can be quickly prepared and served, requiring only perhaps a minute of exposure to hot water. For instance, the final product has been reconstituted and served by placing it in water at 200° F. for just under one minute. The method of the present invention therefore is summarized as including a first step of cooking rice in water over a low heat until the rice is tender. When the rice becomes tender and edible, it is then subjected to the following steps.

It is first frozen, and thereafter thawed. Preferably this is repeated for two complete cycles. Thereafter, it is frozen a third time, and then the ice crystals in the rice granules are sublimated by freeze dehydration. Application of heat by means of heating platens facilitates the sublimation process.

Upon completion of the foregoing process, a dry, light weight, granular product which can be quickly rehydrated has been prepared. Rehydration can be accomplished in a matter of a few seconds. Typically, only a minute or so is required to rehydrate the rice.

While the foregoing summarizes the invention, the following specification is set forth in greater detail, the description being accompanied by no drawings.

The rice to be treated by the method of the present invention is not limited to any particular variety of rice, but is intended for those varieties which are readily available in the United States and quite common to the Oriental countries also. The rice is cooked in water for a sufficient interval of time to become tender and edible. Preferably, it is cooked over a low heat to avoid damage to the kernel and to avoid preparation of a pasty, cohesive mass as opposed to individual grains or kernels. When the cooked rice becomes tender and edible, the next several steps are applied to the rice. The tender and edible rice is frozen and subsequently exposed to two cycles of consecutive thawing and freezing. The freezing is preferably done at quite low temperatures, perhaps in the range of $-10°$ C.– $-20°$ C. While temperatures closer to the freezing level may be used, in the interest of time and expediency a colder temperature is preferably used to quickly freeze the water in the granules.

Thawing is preferably accomplished at room temperature, perhaps in the vicinity of 20° C.–22° C. It is speculated that the porosity of the granule is altered to some extent by the repeated freezing and thawing. Apparently, the porosity is improved in a manner such that the rice particle absorbs the water more readily. This also means that the water is more readily removed, as will be described hereinafter. In any case, the change of porosity enables and permits the rice to quickly reabsorb water when the product of the present invention is later reconstituted.

The cooked rice is subjected to preferably two cycles of thawing and freezing after the initial freezing treatment. While one cycle has been attempted experimentally, the results at least permit substantial rehydration at a much slower rate. Three cycles or more have likewise been attempted, and the results are sometimes improved, but not necessarily so, and may vary dependent on many factors. Consequently, the two cycles constitute the preferred method of the present invention.

After the two complete cycles of thawing and freezing are finished, the ice crystals (water) in the kernels of rice are removed by the freeze drying process. The granular rice is placed on trays within a freeze drying chamber. Heated platens are located above and below the trays which contain the granular rice. The chamber pressure is reduced to less than two hundred fifty microns. At this pressure, heat is applied to the heating platens above and below the trays. The platen temperature is maintained approximately 50° C. during the drying cycle. The ice crystals within the grains of rice are converted into water vapor without passing through the liquid state and, of course, the vapor condenses on refrigerated coils in the chamber maintained at a very low temperature, such as in the range of $-60°$ C. The moisture content (by weight) of the rice granules is less than 3.0 percent at the conclusion of the drying cycle. The product which remains is the granular rice, absent the water, and is a product which is easy to package, requires no refrigeration, and if properly packaged, can be stored indefinitely without undesirable effects.

The dehydrated granules prepared in accordance with the method of the present invention can be readily reconstituted by placing them in water having temperatures in the range of about 50° C. to 100° C. At about 100° C., water will reconstitute the rice prepared in accordance with the present invention within one minute. At lesser temperatures, the process requires somewhat more time, but is still accomplished within one or two minutes. The rehydrability of freeze dried rice has been modified by the consective freezing and thawing cycles.

The ability of the product to be prepared rapidly points out the possibility that the method of the present invention can be used in preparing rice for field uses, as might be found for military personnel, or for campers, and also finds use in preparing a light-weight food which can be prepared quickly by astronauts. The finished product is, as has been emphasized, fully equal to the finished product of conventional rice preparation methods.

The foregoing is directed to the preferred method of the present invention. Deviations and alterations of the method set forth can be supplied by those skilled in the art. The scope of the present invention is determined by the claims which are appended hereto.

What is claimed is:

1. A method of preparing granular rice, comprising the steps of:
   (a) cooking granular rice in water over a low heat until the granular rice is tender and edible;
   (b) freezing and thawing the granular rice for two cycles;
   (c) thereafter freezing the granular rice again; and,
   (d) freeze drying the granular rice to reduce the moisture content to not more than four percent.

2. The invention of claim 1 wherein the freezing is accomplished at a temperature of about $-10°$ C. or below.

3. The invention of claim 2 wherein the thawing is accomplished at ambient room temperatures in the range of approximately 22° C.

4. The method of claim 1 wherein the freeze drying of the rice is accomplished in a closed chamber where the pressure is reduced to less than two hundred fifty microns.

5. The method of claim 1 wherein the drying of the rice is accompanied with heat in the range of approximately fifty degrees centigrade, which is not initiated until after the pressure within the chamber is reduced.

6. The invention of claim 1 wherein the rice is reconstituted by placing it in water having a temperature ranging from approximately fifty to one hundred degrees centigrade for an interval approximating one minute.

7. The method of claim 1 further including the step of rehydrating the rice by placing it in water at about ninety degrees centigrade for about one-half minute.

8. The granular rice as a product prepared in accordance with the method of claim 1.

References Cited

UNITED STATES PATENTS

| | | | |
|---|---|---|---|
| 3,085,012 | 4/1963 | Wayne | 99—81 |
| 3,189,461 | 6/1965 | Ozai-Durrani | 99—80 PS |

RAYMOND N. JONES, Primary Examiner